No. 862,216. PATENTED AUG. 6, 1907.
R. P. THOMPSON.
BEARING.
APPLICATION FILED MAR. 5, 1906.
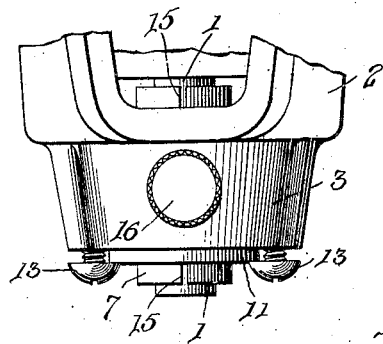
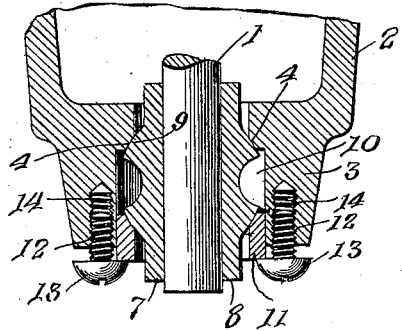
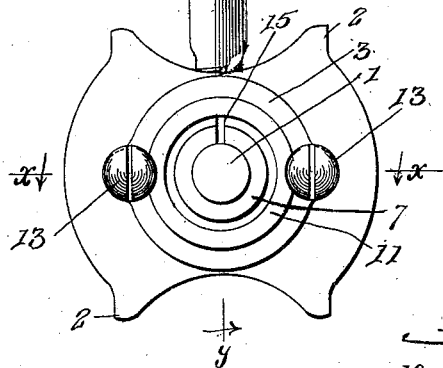
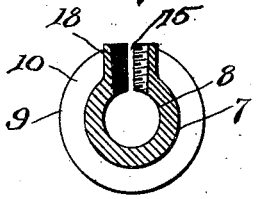
Inventor
Ralph P. Thompson,

UNITED STATES PATENT OFFICE.

RALPH P. THOMPSON, OF SPRINGFIELD, OHIO, ASSIGNOR TO THE ROBBINS AND MYERS COMPANY, OF SPRINGFIELD, OHIO, A CORPORATION OF OHIO.

BEARING.

No. 862,216.      Specification of Letters Patent.      Patented Aug. 6, 1907.

Application filed March 5, 1906. Serial No. 304,154.

*To all whom it may concern:*

Be it known that I, RALPH P. THOMPSON, a citizen of the United States, residing at Springfield, in the county of Clark and State of Ohio, have invented certain new and useful Improvements in Bearings, of which the following is a specification, reference being had therein to the accompanying drawings.

This invention relates to bearings, and more particularly to self-alining bearings for shafts rotating at a relatively high speed, being designed more particularly for use in connection with the armature shafts of electric motors employed for driving fans and the like, although obviously capable of use in other connection.

The main object of the invention is to provide a simple and inexpensive bearing, which may be readily assembled and taken apart, and which, while self-alining, may be readily adjusted.

A further object of the invention is to provide a simple and efficient means for adjusting the bearing to compensate for any wear which may occur.

Yet another object of the invention is to provide a simple and efficient means for positively preventing rotation of the bushing within the bearing sleeve.

To these and other ends my invention consists in certain novel features which I will now proceed to describe, and will then particularly point out in the claims.

In the accompanying drawings, Figure 1 is a plan view of a bearing embodying my invention in one form; Fig. 2 is an end elevation of the same; Fig. 3 is a plan section, taken on the line $x$ $x$ of Fig. 2 and looking in the direction of the arrows; Fig. 4 is a vertical sectional view, taken on the line $y$ $y$ of Fig. 2 and looking in the direction of the arrows; Fig. 5 is a detail plan view of the bushing, detached; and Fig. 6 is a transverse sectional view of the same, taken on the line $z$ $z$ of Fig. 5 and looking in the direction of the arrows.

In the said drawings, 1 represents the revolving shaft, and 2 a portion of the supporting frame, the same being provided with a bearing sleeve 3. This bearing sleeve, instead of being divided transversely, as is usual in bearings of this class, is integral, or formed in a single piece, thereby rendering the structure simple and inexpensive. Within the interior of the sleeve 3 there is provided an annular contact shoulder or abutment 4, the same being preferably formed integrally with the body of said bearing sleeve at the offset located at the junction of the portion 5 of the aperture formed through said sleeve which is of relatively large diameter and the portion 6 of said aperture which is of relatively small diameter.

Within the bearing sleeve 3 there is located a bushing 7, constructed preferably of Babbitt metal or some other similar bearing material. This bushing has a central aperture 8 formed therethrough longitudinally to receive the shaft 1, and is provided at its central portion with a substantially spherical portion or enlargement 9, by means of which said bushing is rendered self-alining. Preferably, the spherical portion 9 of the bushing is grooved or cut away, as indicated at 10, for the purpose of saving metal and lightening the bushing. The maximum diameter of the bushing 7 is less than the diameter of the larger portion 5 of the aperture of the bearing sleeve, so that said bushing may be readily slipped into said bearing sleeve from the outer end thereof until its spherical portion 9 comes into contact with the shoulder or abutment 4 within the sleeve. 11 indicates an abutment ring, fitted to slide within the larger portion 5 of the bore of the bearing sleeve 3, and provided at its inner end with an annular contact or abutment surface 12, arranged to bear against the spherical portion 9 of the bushing on the side thereof opposite to that on which the abutment surface 4 is located. This abutment ring may be introduced into the outer end of the bearing sleeve 3 after the bushing 7 has been inserted therein, and it will be seen that, while the position of the bushing will be determined by the position of the shaft 1, on which it fits, the contact or abutment surfaces 4 and 9 of the bearing sleeve and ring will properly support the bushing within the bearing sleeve whether or not the axis of the shaft is coincident with the axis of said bearing sleeve, owing to the fact that said abutment surfaces bear upon the spherical central portion 9 of the bushing.

The abutment ring 11 is held in place by means of screws 13, the threaded body portions of which enter threaded apertures 14 formed in the bearing sleeve 3 longitudinally thereof, while the heads of said screws overlap and bear upon the outer end of the abutment ring, as shown more particularly in Figs. 1 and 3 of the drawings. By means of these screws, the abutment ring may be readily moved longitudinally of the bearing sleeve into proper position to hold the bushing in place therein, and the removal of said screws, which is readily effected, permits the withdrawal of the abutment ring and bushing when it is desired to inspect or repair the bearing. It will be understood that the abutment ring is pressed against the bushing with a force sufficient not only to maintain the alinement of the bushing with the shaft, but also to hold said bushing in fixed and substantially rigid relation to the bearing sleeve, so that it can neither rotate therein nor become accidentally displaced relatively thereto. Furthermore, the abutment ring slides longitudinally in the sleeve without rotating during this adjustment, so that, after it comes into contact with the bushing, it presses directly against the same without rotating relatively thereto, thereby avoiding any rubbing contact which might mar the contact surfaces or tend to rotate the bushing in the sleeve, which rotation might mar the parts or spoil the alinement.

In its preferred form, my invention also contemplates the adjustment of the bushing to compensate for wear which may occur between said bushing and the shaft rotating therein. To effect this, the bushing is split longitudinally from the exterior to the bore thereof, as indicated at 15. This split or slot is preferably formed through the upper side of the bushing, although it may be located elsewhere. It will be seen that, owing to the spherical form of the central portion 9 against which the abutment surfaces 4 and 12 of the bearing sleeve and abutment ring bear, inward pressure is exerted upon the bushing when the abutment ring is forced against the same through the medium of the adjusting screws 13, and this pressure will act to decrease the diameter of the bushing as the slot 15 closes, thereby tightening the bushing upon the shaft. When this split form of bushing is employed, the adjusting screws 13 form a simple and readily manipulated means for taking up any wear which may occur between the bushing and shaft. Although under ordinary conditions the bushing is so firmly held between the abutment surfaces 4 and 12 as to prevent said bushing from rotating along with the shaft 1 relatively to the bearing sleeve 3, it is desirable to provide means for positively preventing such rotation. I employ for this purpose a lubricating cup 16, which extends down loosely through an aperture 17 in the bearing sleeve 3 and has its lower end threaded into a recess or sleeve 18, with which the bushing 7 is provided to receive said lubricator. It will be seen that the lubricant is thus directly supplied to the bearing surfaces between the shaft and bushing, while the body of the lubricator, by its contact with the wall of the aperture 17 in the bearing sleeve 3, will positively prevent any rotation of the bushing within the bearing sleeve. At the same time, the lubricating cup may be readily unscrewed from its engagement with the bushing and withdrawn when it is desired to remove the bushing from the bearing sleeve, and as readily reëngaged therewith when the parts are again assembled. Since the aperture 17 is of greater diameter than the portion of the lubricating cup which passes through it, this latter does not in any way interfere with the self-alinement or adjustment of the bushing within the sleeve.

In my preferred form of construction, which is that shown, the lubricating cup plays an important part in the adjustment of the bushing as to its bearing contact with the shaft. There is always danger that the bushing may be so adjusted as to fit too tightly on the shaft, and, to remedy this, the lower threaded portion of the cup, and the sleeve 18 which receives the same, are made tapering or conical. In assembling the parts, before the cup is screwed into place, the abutment ring is forced inward with considerable pressure, so as to cause the bushing to fit somewhat tightly on the shaft, more so, in fact, than is required under working conditions. The cup is then screwed in as far as it will go, whereupon the abutment ring is relieved or "backed out" somewhat, to release the bushing. The cup is then screwed further inward a trifle, just sufficiently to enlarge the bushing to such an extent as will prevent it from binding on the shaft, whereupon the abutment ring is again forced inward so as to firmly grip and hold the bushing, while the cup prevents the pressure of said ring from further contracting the bushing and causing it to bind on the shaft. The determining of the ultimate diameter of the bushing by the rotation of the cup gives a minute and accurate adjustment, analogous in character to a micrometer adjustment, and permits the bushing to be readily and nicely adjusted as to its bearing contact on the shaft.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a bearing, the combination, with a rotatory shaft, of a bearing sleeve having an internal abutment shoulder, a bushing fitting said shaft and having a spherical portion bearing on one side against said abutment shoulder, said bushing being provided with a tapering aperture in said spherical portion and being split longitudinally along one side from said aperture towards its ends, a tapering part screwing into said aperture, and an abutment ring adjustable longitudinally with respect to the bearing sleeve towards its abutment shoulder, said ring being provided with an abutment shoulder to bear upon the opposite side of the spherical portion of the bushing, substantially as described.

2. In a bearing, the combination, with a rotatory shaft, of a bearing sleeve having an internal abutment shoulder, a bushing fitting said shaft and having a spherical portion bearing on one side against said abutment shoulder, said bushing being provided with a tapering aperture in said spherical portion and being split longitudinally along one side from said aperture towards its ends, a lubricating cup having a tapering extremity screwing into said aperture, and an abutment ring adjustable longitudinally with respect to the bearing sleeve towards its abutment shoulder, said ring being provided with an abutment shoulder to bear upon the opposite side of the spherical portion of the bushing, substantially as described.

In testimony whereof, I affix my signature in presence of two witnesses.

RALPH P. THOMPSON.

Witnesses:
E. O. HAGAN,
IRVINE MILLER.